(12) United States Patent
Friedl et al.

(10) Patent No.: US 7,775,722 B2
(45) Date of Patent: Aug. 17, 2010

(54) DOUBLE-ROW ANTIFRICTION BEARING

(76) Inventors: Wolfgang Friedl, Am Dachsberg 28, A-4400 Steyr (AT); Julie Satha, 8 Graphic Close, Dunstable, Bedfordshire LU6 3 EL (GB)

( * ) Notice: Subject to any disclaimer, the term of this patent is extended or adjusted under 35 U.S.C. 154(b) by 733 days.

(21) Appl. No.: 10/587,573

(22) PCT Filed: Jan. 27, 2005

(86) PCT No.: PCT/EP2005/000776
§ 371 (c)(1), (2), (4) Date: Jun. 13, 2007

(87) PCT Pub. No.: WO2005/073573
PCT Pub. Date: Aug. 11, 2005

(65) Prior Publication Data
US 2007/0242914 A1  Oct. 18, 2007

(30) Foreign Application Priority Data
Jan. 31, 2004  (DE) ............... 20 2004 001 454 U

(51) Int. Cl.
  *F16C 19/56* (2006.01)
  *F16C 33/60* (2006.01)
  *F16C 19/08* (2006.01)

(52) U.S. Cl. ............. 384/512; 384/504; 384/506; 384/513

(58) Field of Classification Search ......... 384/462, 384/490, 492, 512–513, 515, 526–527, 544, 384/548, 552, 596, 504, 506
See application file for complete search history.

(56) References Cited

U.S. PATENT DOCUMENTS

| 2,019,464 | A | * | 10/1935 | Riblet | 384/571 |
| 3,937,535 | A | * | 2/1976 | Ladin | 384/544 |
| 4,248,487 | A | | 2/1981 | Asberg | |
| 5,015,105 | A | * | 5/1991 | Ueno | 384/531 |
| 5,131,762 | A | * | 7/1992 | Waskiewicz | 384/526 |

(Continued)

FOREIGN PATENT DOCUMENTS

DE   43 05 289 A1   9/1993

(Continued)

OTHER PUBLICATIONS

Hochgenauigkeitslager für höchste Drehzahlen, Produkte + Systeme Antriebstechnik, SKF Linearsysteme, 97424 Schweinfurt p. 25.

(Continued)

*Primary Examiner*—Marcus Charles
(74) *Attorney, Agent, or Firm*—Buchanan Ingersoll & Rooney PC

(57) ABSTRACT

A double-row roller bearing comprises a one-piece bearing ring, a bearing ring that is split in the axial direction, and rolling bodies that are arranged between the two bearing rings. The rolling body of the first row has a first diameter, and the rolling body of the second row has a second diameter that is different to the diameter of the rolling body of the first row. The rolling bodies consist of a ceramic material, and the contact angle of the first rolling body row is different to the contact angle of the second rolling body row.

14 Claims, 2 Drawing Sheets

U.S. PATENT DOCUMENTS

| | | | | |
|---|---|---|---|---|
| 5,226,737 | A | * | 7/1993 | Sandy, Jr. .................... 384/512 |
| 5,273,413 | A | | 12/1993 | Wallin |
| 5,852,947 | A | | 12/1998 | Tsujimoto et al. |
| 6,015,264 | A | * | 1/2000 | Violette et al. .............. 384/540 |
| 6,048,101 | A | * | 4/2000 | Rasmussen ................. 384/616 |
| 6,277,713 | B1 | | 8/2001 | Chao |
| 6,478,553 | B1 | * | 11/2002 | Panos et al. ................. 384/527 |
| 6,769,809 | B2 | * | 8/2004 | Maret ......................... 384/512 |
| 6,824,489 | B2 | * | 11/2004 | Jacob et al. ................. 384/504 |
| 6,861,836 | B2 | * | 3/2005 | Sammataro et al. ......... 324/260 |
| 6,957,919 | B2 | * | 10/2005 | Kern et al. ................... 384/512 |
| 7,150,565 | B1 | * | 12/2006 | Koyama et al. ............. 384/548 |
| 2002/0181816 | A1 | | 12/2002 | Boyd et al. |
| 2002/0186910 | A1 | | 12/2002 | Maret |
| 2003/0106384 | A1 | | 6/2003 | Yokota et al. |

FOREIGN PATENT DOCUMENTS

| | | | |
|---|---|---|---|
| DE | 297 04 386 | U1 | 6/1997 |
| DE | 198 45 671 | C1 | 4/2000 |
| DE | 102 39 742 | A1 | 11/2003 |
| EP | 0 501 506 | A2 | 9/1992 |
| EP | 1719926 | A1 * | 11/2006 |
| FR | 2 798 433 | | 3/2001 |
| GB | 152018 | | 6/1921 |
| JP | 63115913 | A * | 5/1988 |
| JP | 10-37951 | A | 2/1998 |
| JP | 2000-2239 | A | 1/2000 |
| JP | 2000035044 | A * | 2/2000 |
| JP | 2003-42162 | A | 2/2003 |
| JP | 2003-294032 | A | 10/2003 |
| JP | 2004245247 | A * | 9/2004 |
| WO | WO 85/03749 | A1 | 8/1985 |
| WO | WO 99/02873 | | 1/1999 |

OTHER PUBLICATIONS

Hochgenauigkeitslager fur hochste Drehzahlen, Produkte + Systeme Antriebstechnik, SKF Linearsysteme, 97424 Schweinfurt p. 25 with English language translation.

* cited by examiner

DOUBLE-ROW ANTIFRICTION BEARING

FIELD OF THE INVENTION

The invention relates to a double-row antifriction bearing which has a one-piece bearing ring and a bearing ring divided into two parts in the axial direction, and rolling elements located between them, the rolling elements of the first row of rolling elements having a first diameter and the rolling elements of the second row of rolling elements having a second diameter which is different from the diameter of the rolling elements of the first row of rolling elements.

BACKGROUND DISCUSSION

An antifriction bearing of the generic type is described for example in GB 152 018. Bearings of this type are used for example in high performance motor vehicles, i.e. in auto racing. In particular, the gear shafts of a race car are supported with these bearings. Since the requirements for rpm and stiffness of the bearing are very high here, the bearings are moreover made as four-point bearings; but this limits the forces which can be transmitted. At correspondingly high loads and large rpm known antifriction bearings quickly reach their limits.

SUMMARY

Therefore the object of the invention is to develop an antifriction bearing of the initially mentioned type such that it is suited to accommodating higher forces at very high rpm, as occur especially in the transmissions of race cars.

The inventions's achieving this object is characterized in that the rolling elements of the two rows of rolling elements consist of ceramic material and the contact angle of one row of rolling elements is different from the contact angle of the other row of rolling elements.

Preferably the one-piece bearing ring is the outer ring of the bearing and the split bearing ring is the inner ring.

A value in the range between 5° and 35° has proven itself as the contact angle of one row of rolling elements. Conversely, preferably the contact angle of the other row of rolling elements in the range between 10° and 60° is used.

As known in the indicated applications in auto racing, the outer ring preferably has a flange molded on in one piece. This flange can be located with respect to its axial position at the height of one of the rows of rolling elements.

For optimum supply of the bearing with lubricant it is provided according to the development that lubrication openings are made in the contact area of the front surfaces of the split bearing ring. Furthermore it can be provided that the outer ring is provided with lubrication openings, especially with lubrication holes.

Preferably the rows of rolling elements have cages which are guided on one shoulder of at least one of the bearing rings. Advantageously the cages are guided on one shoulder of the split bearing ring. Plastic, preferably PEEK, has proven itself as the material of the cage.

The rolling elements are preferably made as balls. The bearing thus assumes the design of an angular contact bearing.

The proposed antifriction bearing is preferably used as a component of a transmission which in operation has very high rpm and a high temperature, especially in a race car.

With the proposal as claimed in the invention an antifriction bearing is devised which under extreme conditions has good running behavior and a relatively long service life. It is optimally suited to use in the transmission of a race car in which very high forces occur at high rpm and high operating temperatures.

BRIEF DESCRIPTION OF THE DRAWINGS

One exemplary embodiment of the invention is shown in the drawings.

DETAILED DESCRIPTION

Figure 1:
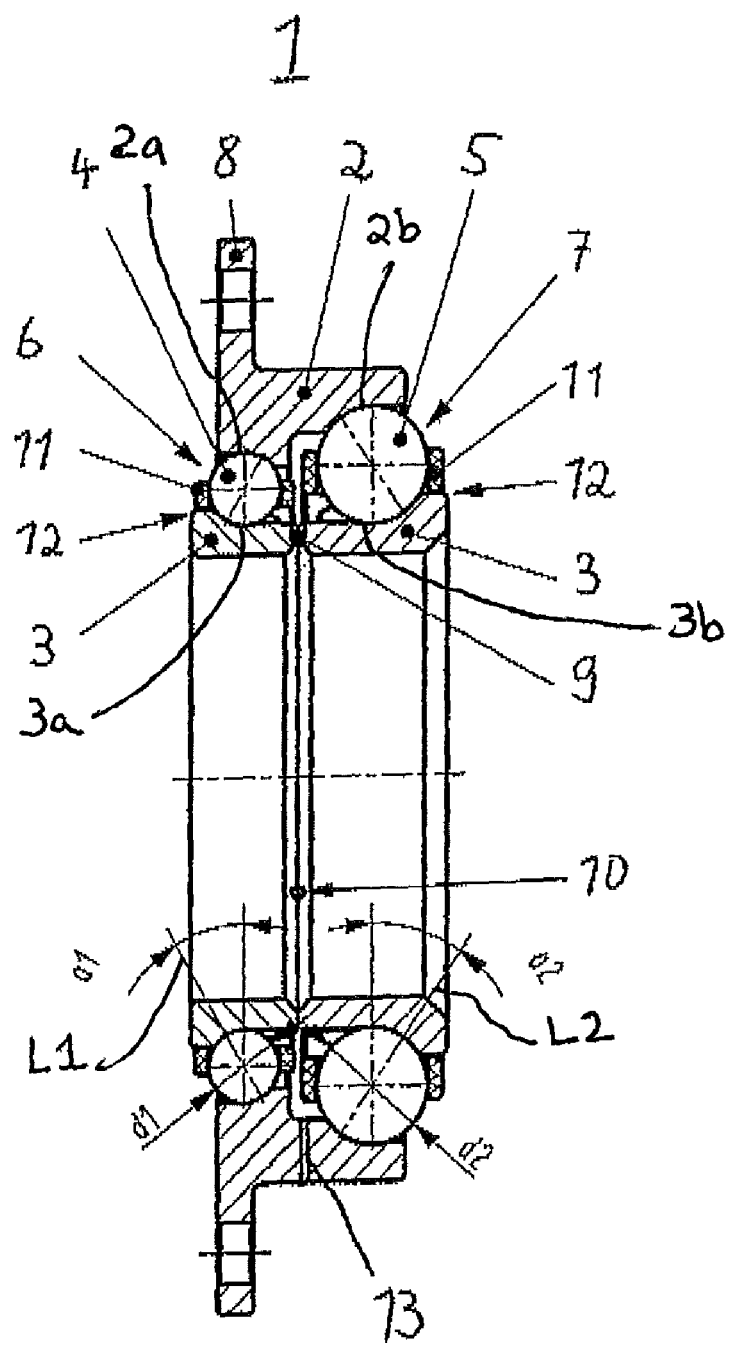
FIG. 1 shows a radial section through a double-row antifriction bearing (section I-II according to FIG. 2)
Figure 2:
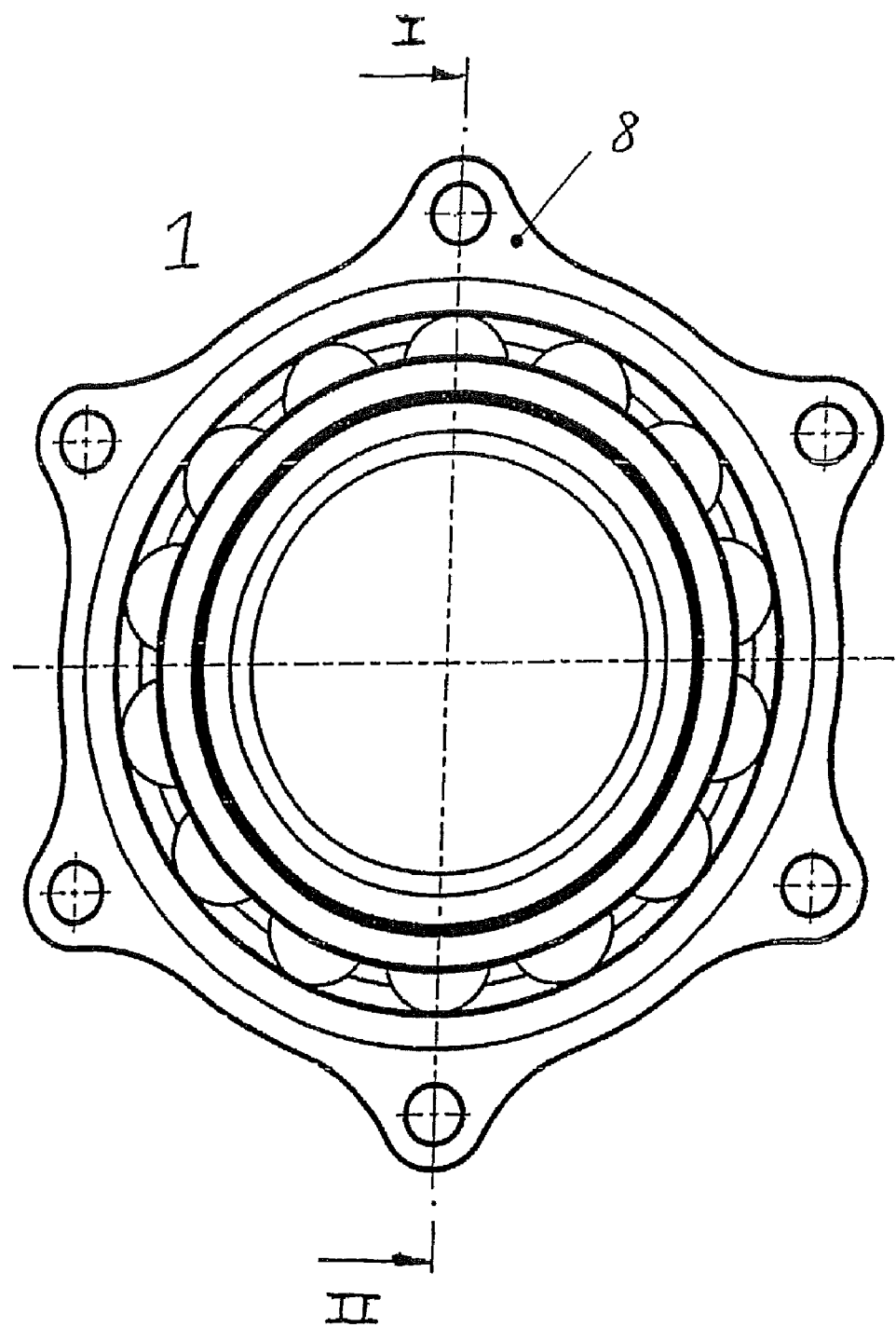
FIG. 2 shows a side view of this bearing.

The antifriction bearing 1 shown in the figures has a one-piece bearing ring, the outer ring 2, and a split bearing ring, specifically the inner ring 3. The outer ring 2 forms first and second raceways 2a, 2b, and the inner ring 3 forms third and fourth raceways 3a, 3b, respectively. Between the outer ring 2 and the (split) inner ring 3 there are rolling elements 4 and 5 in the form of balls of ceramic material. Ceramic balls in an antifriction bearing are known as such in the prior art. The rolling elements 4 and 5 each form a row 6 and 7 of rolling elements, respectively.

The antifriction bearing 1 here is made as an angular contact bearing. The rolling elements 4 contact only diagonally opposite sides of the first and third raceways 1a, 3a respectively, so the contact area lies on a non-radial line L1. The rolling elements 5 contact only diagonally opposite sides of the second and fourth raceways 2b, 3b, respectively, so the contact area lies on a non-radial line L2. The contact area between the rolling elements 4, 5 and their respective raceways in the bearing rings 2, 3 is therefore at an angle to the radial direction. The contact angles are labelled $a_1$ and $a_2$ for the two rows 6 and 7 of rolling elements, respectively. The contact angle $a_1$ of the first row 6 of rolling elements is in the range between 5° and 35°. Conversely the contact angle $a_2$ of the second row 7 of rolling elements is in the range between 10° and 60°.

Furthermore, it can be seen that for the two rows 6 and 7 of rolling elements balls 4, 5 with different diameters $d_1$ and $d_2$ are used. The diameter $d_1$ of the first row 6 of rolling elements is much smaller than the diameter $d_2$ of the second row 7 of rolling elements; it is preferably in the range between 50% and 80% of the diameter $d_2$.

The pitch circles of the two rows 6 and 7 of rolling elements are different. The one of the first row 6 of rolling elements is smaller than that of the second row 7 of rolling elements. Preferably the radius of the pitch circle of the first row 6 of rolling elements is between 85% and 95% of the radius of the pitch circle of the second row 7 of rolling elements.

As furthermore follows from the figures, the outer ring 2 is made such that its radially outer periphery passes into a flange 8 which is provided with a number of through holes with which the outer ring 2 can be fixed on a machine part. The axial position of the flange 8 is located in this connection exactly at the height of the first row 6 of rolling elements.

The two inner rings 3 are opposite one another on the facing side with their front surfaces 9. It is suggested that there is a lubricating opening 10 here with which it is possible to supply the contact point between the rolling elements 4, 5 and the raceways with lubricant.

The two rows of rolling elements 6, 7 in the known manner also have cages 11. They consist of plastic, preferably of the plastic material PEEK. The two inner rings 3 each have one shoulder 12 against which the respective cage 11 rests and is guided.

The osculations between the balls 4 and 5 and their raceways in the bearing rings 2, 3 are conventionally selected such that low-friction running results. The same applies to the choice of the bearing slackness for the two rows of rolling elements.

The invention claimed is:

1. Double-row antifriction bearing for a transmission adapted to operate at a very high number of revolutions and high temperature comprising:

one-piece bearing ring forming first and second raceways;

split bearing ring divided into two parts in an axial direction of the bearing and forming third and fourth raceways respectively;

rolling elements located between the one-piece bearing ring and the split bearing ring;

the rolling elements comprising a first row of spherical rolling elements possessing a first diameter and a second row of spherical rolling elements possessing a second diameter which is different from the diameter of the rolling elements of the first row of rolling elements;

the spherical rolling elements being balls made of ceramic material;

wherein the rolling elements of the first row contact only diagonally opposite sides of the first and third raceways, respectively, and the rolling elements of the second row contact only diagonally opposite sides of the second and fourth raceways, respectively, wherein a contact area of the rolling elements of the first row with the first and third raceways forms a first contact angle, and a contact area of the rolling elements of the second row with the second and fourth raceways forms a second contact angle, the contact angle of the first row of rolling elements having a size different from the size of the contact angle of the second row of rolling elements, wherein the antifriction bearing is constructed as an angular contact ball bearing; and a pitch circle of the first row of rolling elements being different from the pitch circle of the second row of rolling elements.

2. Antifriction bearing as claimed in claim 1, wherein the one-piece bearing ring is an outer ring of the antifriction bearing and the split bearing ring is an inner ring of the antifriction bearing.

3. Antifriction bearing as claimed in claim 2, wherein the outer ring has a flange molded on in one piece.

4. Antifriction bearing as claimed in claim 3, wherein the flange is with respect to its axial position located at a position of one of the rows of rolling elements.

5. Antifriction bearing as claimed in claim 2, wherein the outer ring is provided with lubrication openings.

6. Antifriction bearing as claimed in claim 1, wherein the contact angle of the first row of rolling elements is in the range between 5° and 35°.

7. Antifriction bearing as claimed in claim 6, wherein the contact angle of the second row of rolling elements is in the range between 10° and 60°.

8. Antifriction bearing as claimed in claim 1, further comprising lubrication openings in a contact area of front surfaces of the split bearing ring.

9. Antifriction bearing as claimed in claim 1, wherein the first and second rows of rolling elements have cages which are guided on one shoulder of at least one of the bearing rings.

10. Antifriction bearing as claimed in claim 9, wherein the cages are guided on a shoulder of the split bearing ring.

11. Antifriction bearing as claimed in claim 9, wherein the cages are made of plastic.

12. Antifriction bearing as claimed in claim 9, wherein the cages are made of PEEK.

13. Antifriction bearing as claimed in claim 2, wherein the outer ring is provided with lubrication holes.

14. Antifriction bearing as claimed in claim 1, wherein the antifriction bearing is a component of a transmission in a race car.

* * * * *